Patented Feb. 14, 1950

2,497,509

UNITED STATES PATENT OFFICE 2,497,509

STABLE, SUPERSATURATED AQUEOUS SOLUTIONS OF SACCHARIDE DERIVATIVES OF THE SUPRARENAL CORTICAL HORMONE SERIES AND PROCESS OF MAKING SAME

Karl Miescher, Riehen, and Charles Meystre, Basel, Switzerland, assignors to Ciba Pharmaceutical Products Inc., Summit, N. J., a corporation of New Jersey No Drawing. Application November 21, 1945, Serial No. 630,116. In Switzerland December 22, 1944

12 Claims. (Cl. 167—77)

1

U. S. patent application No. 490,536, filed June 11, 1943 (Pat. No. 2,411,631), describes a process for the manufacture of stable, supersaturated solutions of saccharide derivatives of the suprarenal cortical hormone series which consists in the dissolution of these derivatives in aqueous solutions containing as hydrotropic agent a physiologically inert proportion of a water-soluble organic compound containing oxygen with the exclusion of any crystallization nucleus. That patent explains in detail the use of members of the sugar series, such as glucose as organic compounds containing oxygen. Further investigations have now shown that in certain cases, at a low temperature, e. g. 0° C., separations still occur from such supersaturated solutions.

It has now been found that solutions of saccharide derivatives of the suprarenal cortical hormone series of U. S. patent application No. 490,536, filed June 11, 1943 (now Patent No. 2,411,631), can be given practically unlimited stability by the use of amides of lower monocarboxylic acids as organic compounds containing oxygen. It has also been found that by the further addition of a sugar, such as glucose, the local compatibility in the case of injections of the solution can be increased.

As saccharide derivatives of the suprarenal cortical hormone series there are used, for example, the compounds described in the patent referred to above, and as amides of lower monocarboxylic acids, for example, acetamide, propionamide, butyramide, isovaleramide, or mixtures thereof.

The resulting solutions are intended for therapeutic use.

The following examples illustrate the invention, but are not to be regarded as limiting it in any way, the parts being by weight:

Example 1

1 part of β-d-glucoside of desoxycorticosterone is dissolved in 100 parts of an aqueous acetamide solution of 10 per cent. strength by heating on the water bath. Kept in sealed ampules, the clear, supersaturated solution remains completely dissolved, even at a temperature of 0° C.

These ampules may be sterilized at 100° C. without decomposition of the glucoside. Upon dilution with water or blood serum no precipitation occurs.

Example 2

1 part of β-d-glucoside of desoxycorticosterone, 10 parts of acetamide, 10 parts of d-glucose and 100 parts of water are heated together on the water-bath until completely dissolved. No crystals will separate, not even at 0° C.

Analogously, solutions of other glucosides of desoxycorticosterone can be made, for example of the lactoside or maltoside. Instead of the glucoside of desoxycorticosterone, there may as well be used successfully glucosides of other compounds of the suprarenal cortical hormone series, such as of corticosterone, dehydrocorticosterone, and the like.

Equally stable solutions are obtained by using, instead of acetamide, other amides of lower monocarboxylic acids, for example propionamide or mixtures of acetamide and propionamide.

What we claim is:

1. A process for the manufacture of a stable, supersaturated solution of a saccharide derivative of the suprarenal cortical hormone series, which comprises dissolving the said saccharide derivative in an aqueous solution containing an amide of a lower fatty acid in a concentration sufficient to effect stabilization of the solution against the formation of a crystallization nucleus, and in a physiologically inert proportion, the fatty acid amide content of the aqueous solution being about 10%.

2. A process for the manufacture of a stable, supersaturated solution of a saccharide derivative of the suprarenal cortical hormone series, which comprises dissolving the said saccharide derivative in an aqueous solution containing a physiologically inert proportion of glucose and of an amide of a lower fatty acid, the latter being present in a concentration sufficient to effect stabilization of the solution against the formation of a crystallization nucleus, the glucose content of the said aqueous solution and the fatty acid amide content of said solution being each about 10%.

3. A process for the manufacture of a stable, supersaturated solution of a saccharide derivative of the suprarenal cortical hormone series, which comprises dissolving the said saccharide derivative in an aqueous solution containing a mixture of lower fatty acid amides in a concentration sufficient to effect stabilization of the solution against the formation of a crystallization nucleus, and in a physiologically inert proportion, the lower fatty acid amides content of the said aqueous solution being about 10%.

4. A process for the manufacture of a stable, supersaturated solution of a saccharide derivative of the suprarenal cortical hormone series, which comprises dissolving the said saccharide derivative in an aqueous solution containing a physiologically inert proportion of glucose and of a mixture of lower fatty acid amides, the latter being present in a concentration sufficient to effect stabilization of the solution against the formation of a crystallization nucleus, the glucose content of the said aqueous solution and the fatty acid amides content of said solution being each about 10%.

5. A process for the manufacture of a stable, supersaturated solution of a glucoside of desoxycorticosterone, which comprises dissolving the said saccharide derivative in an aqueous solution containing acetamide in a concentration sufficient to effect stabilization of the solution against the formation of a crystallization nucleus, and in a physiologically inert proportion, the acetamide content of the aqueous solution being about 10%.

6. A process for the manufacture of a stable, supersaturated solution of a glucoside of desoxycorticosterone, which comprises dissolving the said saccharide derivative in an aqueous solution containing a physiologically inert proportion of glucose and of acetamide, the latter being present in a concentration sufficient to effect stabilization of the soltuion against the formation of a crystallization nucleus, the glucose content and the acetamide content of the said aqueous solution each being about 10%.

7. A stable, supersaturated aqueous solution of a saccharide derivative of the suprarenal cortical hormone series containing a physiologically inert proportion of an amide of a lower fatty acid in a concentration sufficient to effect stabilization of the solution against the formation of a crystallization nucleus, the lower fatty acid amide content of the said aqueous solution being about 10%.

8. A stable, supersaturated aqueous solution of a saccharide derivative of the suprarenal cortical hormone series containing a physiologically inert proportion of glucose and of an amide of a lower fatty acid in a concentration sufficient to effect stabilization of the solution against the formation of a crystallization nucleus, the glucose content of the said solution and the lower fatty acid amide content of the said solution each being about 10%.

9. A stable, supersaturated aqueous solution of a saccharide derivative of the suprarenal cortical hormone series containing a physiologically inert proportion of a mixture of lower fatty acid amides in a concentration sufficient to effect stabilization of the solution against the formation of a crystallization nucleus, the lower fatty acid amides content of the said aqueous solution being about 10%.

10. A stable, supersaturated aqueous solution of a saccharide derivative of the suprarenal cortical hormone series containing a physiologically inert proportion of glucose and of a mixture of lower fatty acid amides in a concentration sufficient to effect stabilization of the solution against the formation of a crystallization nucleus, the glucose content of the said solution and the lower fatty acid amides content of the said solution each being about 10%.

11. A stable, supersaturated aqueous solution of a glucoside of desoxycorticosterone containing about 10% of acetamide.

12. A stable, supersaturated aqueous solution of a glucoside of desoxycorticosterone containing about 10% of glucose and also containing about 10% of acetamide.

KARL MIESCHER.
CHARLES MEYSTRE.

REFERENCES CITED

The following references are of record in the file of this patent:

UNITED STATES PATENTS

| Number | Name | Date |
|---|---|---|
| 1,658,122 | Günzler | Feb. 7, 1928 |
| 1,921,722 | Berendes | Aug. 8, 1933 |
| 2,067,317 | Gruber | Jan. 12, 1937 |
| 2,270,379 | Miescher | Jan. 20, 1942 |
| 2,289,050 | Schinder | July 7, 1942 |
| 2,411,631 | Miescher | Nov. 26, 1946 |